United States Patent [19]

Kittell

[11] Patent Number: 4,609,302

[45] Date of Patent: Sep. 2, 1986

[54] FLEXURE

[76] Inventor: David H. Kittell, 42 Ardsley Rd., Stamford, Conn. 06906

[21] Appl. No.: 710,555

[22] Filed: Mar. 11, 1985

[51] Int. Cl.$^4$ ............................ F16B 7/10; F16D 3/72
[52] U.S. Cl. .................................. 403/53; 403/291; 403/364; 464/97; 464/162
[58] Field of Search ............... 464/162, 71, 137, 97, 464/57, 51; 403/286, 287, 291, 380, 364, 335, 336, 337, 57, 58, 74, 53; 74/5 F

[56] References Cited

U.S. PATENT DOCUMENTS

| | | | |
|---|---|---|---|
| 2,494,574 | 1/1950 | Murphy | 403/336 |
| 3,085,497 | 4/1963 | Statia, Sr. | 464/162 |
| 3,159,987 | 12/1964 | Thompson et al. | 464/97 |
| 3,500,754 | 3/1970 | Boes et al. | 464/97 |
| 3,592,284 | 7/1971 | Mennesson | 464/71 |
| 3,748,912 | 7/1973 | Hildebrand | 74/5 F |
| 4,030,371 | 6/1977 | Bulman et al. | 74/5 F |
| 4,413,980 | 11/1983 | Walloch | 464/71 |

FOREIGN PATENT DOCUMENTS 2402218  1/1974  Fed. Rep. of Germany ...... 403/364

Primary Examiner—Cornelius J. Husar
Assistant Examiner—Peter M. Cuomo
Attorney, Agent, or Firm—David P. Gordon

[57] ABSTRACT

A three axis flexure joint is provided which is very stiff against translational forces along its long axis but is operable with three degrees of freedom over small angles with no lost motion. The flexure comprises two spaced metal connectors, which are connected to each other by a wire which runs through the metal connectors along an axis and is integrally joined to each connector, and at least one snubber pin. The snubber pin snugly fits into a bore of one connector of the flexure, the bore being arranged to accept the pin and to be parallel to the wire axis, while in the second connector, the pin has a loose fit in a corresponding hole similarly located. In this manner, the integrity of the connecting wire is maintained as the pins act as stops to rotation if rotation of either connector around any of its axes exceeds a predetermined limit. The flexure is also preferably configured with each connector being a bolt or screw so as to permit easy connection of the flexure to rods and master and slave devices.

20 Claims, 6 Drawing Figures

FLEXURE

BACKGROUND OF THE INVENTION

This invention relates to flexure joints in general. More particularly, this invention relates to a flexure which provides a joint between two objects, the flexure being very stiff against translational forces along its long axis, but permitting small angle rotation around the two axes normal to the long axis as well as around the long axis. Thus, the invention may be said to provide the action of a limited range ball joint without lost motion as it is operable with three degrees of freedom over small angles.

Various types of flexure joints have been developed to permit small amounts of rotation of one joined object relative to the other. Generally, however, the flexure joints of the art do not permit rotation around three axes. Thus, for example, U.S. Pat. No. 4,128,352, to Newell, and U.S. Pat. No. 3,844,663 to Raines both provide a two axis flexure, while U.S. Pat. No. 3,844,663 to Prette permits one degree of freedom. Other flexures available in the art often fail to exhibit the required degree of stiffness with respect to translational forces, and many suffer from the problems of stick slip or lost motion. The latter problems are especially evident in ball joints which are designed to provide rotation around all three axes. Thus, if the socket is tight around the ball, the ball sticks in the socket until enough force is provided to overcome the friction. This causes the force/displacement relationship to be unpredictable thereby making precise control difficult. On the other hand, if the ball is loose in the socket, the positioning of the ball cannot be completely controlled to the microinch level of precision (due to inherent uncertainty) as is often required in interferometry or microlithography. Ball joints, as well as other joints provided in the art also suffer from the requirement that they be lubricated, which in certain circumstances, such as space applications, leads to undesirable outgassing and depletion problems as well as temperature limitations.

SUMMARY OF THE INVENTION

It is therefore an object of this invention to provide a flexure which provides a joint operable over small angles.

It is a further object of the invention to provide a flexure which operates with no lost motion and which is very stiff against translational forces along its long axis.

It is yet a further object of the invention to provide a flexure which requires no lubrication and which is deterministic in its positioning at a microscopic level.

In accord with the objects of the invention, a three axis flexure is provided which comprises two spaced metal connectors, such as bolts or screws, which are connected to each other by a wire which runs through the metal connectors along an axis and is integrally joined to each connector, such as by electron beam welding. The central wire is the flexing element having bending and twisting flexibility. The flexure also preferably further comprises one or more pins which, in one connector of the flexure, each snugly fits in a hole in the connector face nearest the other connector, the holes bored parallel to the wire axis; while in the second connector, the pins have a loose fit in corresponding holes similarly located. In this manner, the integrity of the central connecting wire is maintained since the pins act as stops or snubbers to rotation if rotation of either connector around any of its axes exceeds a predetermined limit. The pins thus help prevent the application of excessive stress on the wire. With the connecting wire and the pins, the flexure provides stiffness with respect to translational forces along the long axis, while providing a joint which permits limited rotation around all three axes. The flexure is also preferably configured with each connector being a bolt or screw so as to permit easy connection of the flexure to rods and to master and slave. devices.

In most applications, the flexure of the invention will be used in pairs, with one connector of each pair being connected to a rod. In this manner, an object attached to one flexure of the pair can be moved over larger distances relative to an object attached to the other flexure without forcing the flexures beyond their limited angular freedom of rotation. Of course, because the pair of flexures, as well as any device connecting the pair, are stiff along the long axis, the distance between the two objects being connected will always remain constant.

A better understanding of the invention, and additional advantages and objects of the invention will become apparent to those skilled in the art upon reference to the detailed description and the accompanying drawings.

DETAILED DESCRIPTION OF THE PREFERRED EMBODIMENT

Figure 1:
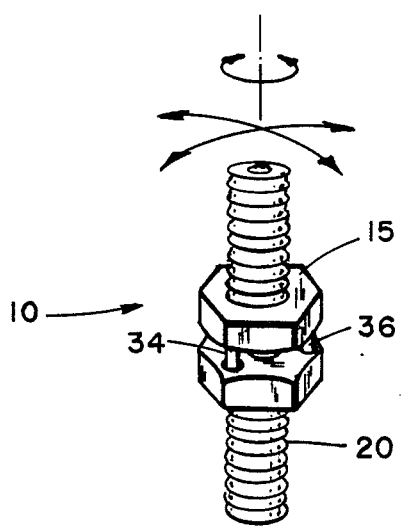
FIG. 1 shows a perspective view of the three axis flexure invention.
Figure 2:
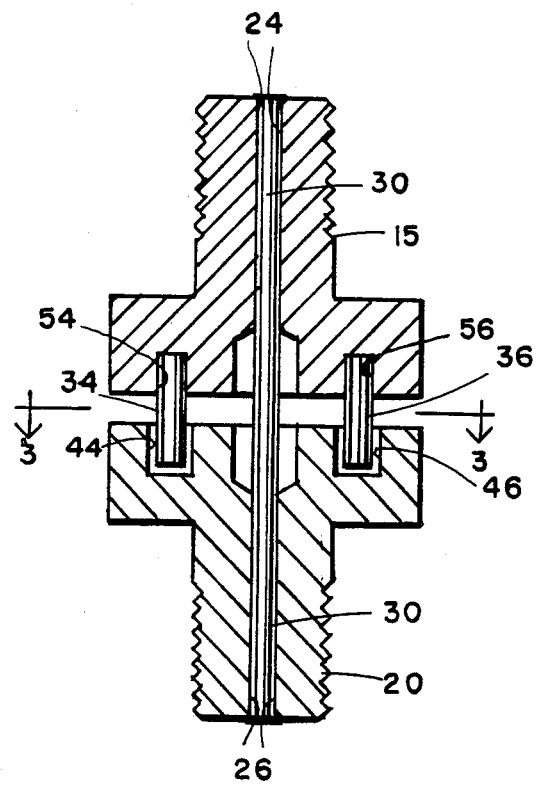
FIG. 2 is a cross-sectional view of the flexure.
Figure 3:
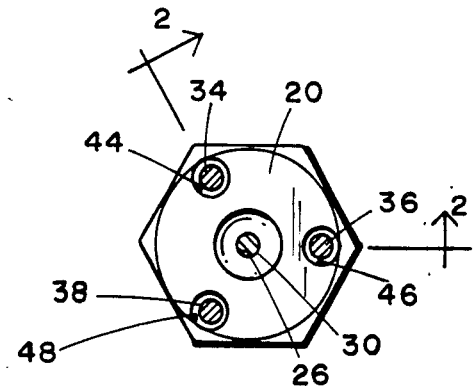
FIG. 3 is a cross-sectional view of the flexures as viewed from line 3—3 of FIG. 2.

The three axis flexure invention generally denoted by 10 as seen in FIGS. 1 through 3, comprises two metal connectors 15 and 20 which are connected to each other by a wire 30. According to the best mode of the invention, connectors 15 and 20 are spaced from each other along the axis defined by wire 30 (such axis being defined as the "long axis"). Wire 30 is the flexing element which provides bending and twisting flexibility. Metal connectors 15 and 20 are preferably screws or bolts which may act as attachment mechanisms, as the three axis flexure 10 is typically connected on both ends to other devices, as will be further described below. Each screw connector is arranged to have a bore running preferably along an axis such that wire 30 can be placed therein and integrally joined to each connector through welding techniques such as by electron or laser beam welding. In FIG. 2, the bore in screw 15 is denoted by 24, while the bore in screw 20 is denoted by 26. According to the preferred embodiment, bores 24 and 26 run the entire length of screw connectors 15 and 20 and are almost exactly the same diameter as thin wire 30, except that as the bores near the center of the flexure, they taper outwardly. Thus, as wire 30 approaches the flexure center, it is not welded in place but is free to flex with three degrees of freedom (around its three axes) when torque is applied to the scews. The outward taper of the bores in the connectors serves to extend the bending length of the wire 30 to thereby permit bending over larger angles than would otherwise be possible. Thus, in designing the flexure for various applications, one skilled in the art must consider that the maximum bend in the wire must be distributed over a long enough length so as to provide adequate flexibility while preserving the durability of the wire material. Thus, stress and strain characteristics are considered. Of course, in choosing a wire, compressional strength must also be considered, because the flexure assembly invention is designed to remain stiff to translational forces along its long axis.

The flexure also further comprises at least one snubber or stop pin which, in one connector of the flexure, snugly fits in an additional hole bored in the face of the connector perpendicular to the long axis, while in the second connector, the pin has a loose fit in a corresponding hole similarly located. Thus, as indicated in FIG. 2, stop pins 34, 36, and 38 are press fit respectively in bores 54, 56, and 58 (the last not shown) in the bottom face of screw connector 15, while as seen in FIG. 3, the same pins have a loose fit in the corresponding similar bores 44, 46, and 48 in screw 20. The pins are also preferably arranged so that they do not touch the bottoms of bores 44, 46 and 48. When a plurality of snubber pins are utilized, they are preferably spaced evenly about the central wire 30.

Pins 34, 36, and 38 help maintain the integrity of the thin connecting wire 30 by acting as stops to the connector rotation if rotation of either connector around any of its axes exceeds a predetermined limit. Thus, as stated above, wire 30 is carefully chosen according to the particular flexure application by its particular characteristics, such as stress and strain characteristics. Knowing the characteristics of the wire 30, the diameter of the pin bores as compared to the pins may be chosen so as to permit screw connectors 15 and 20 to rotate about their axes to a certain extent, but to stop rotation when rotation might cause damage to wire 30. Thus, if the bending of the flex wire 30 exceeds a safe angle, the bending is stopped by the action of a stop pin(s) against either the bottom or the side wall of its corresponding loose bore. A typical permissable rotation before pin stops 34, 36, and 38 are activated may be ten degrees. Those skilled in the art will recognize that by arranging the pins around wire 30 in a different configuration, and/or by making loose bores 44, 46, and 48 of differing diameters or heights, flexure 10 can be made to permit differing amounts of rotation around the different axes.

With the connecting wire 30 and the pins 34, 36, and 38 so arranged, the flexure 10 provides stiffness with respect to translational forces along the long axis while providing a joint which permits limited rotation around all three axes, as indicated by the arrows of FIG. 1. Thus, when a torque is applied to connector 15, with connector 20 being fixed, connector 15 will move around one or more of its axes and thus move relative to connector 20. However, when an axial force is applied to either connector, the connectors do not move relative to each other due to the stiffness of the flexure 10, but rather transmit the axial force.

Figure 6:
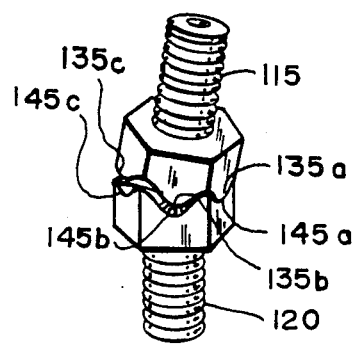
FIG. 6 is a perspective view of an alternative embodiment of the three axis flexure invention.

An alternative embodiment to the preferred flexure invention is seen in FIG. 6, where instead of using snubbing pins to limit rotation around the axes, the opposing faces of connectors 115 and 120 are provided with corresponding ridges and valleys to provide the stopping function. Thus, ridges 135a, 135b, and 135c on connector 115 may be considered the equivalent to the snubbing pins of the embodiment seen in FIGS. 1-3, while valleys 145a, 145b, and 145c on connector 120 may be considered the equivalent of the loose bores. It will be recognized, of course, that ridges between the valleys on connector 115, and the valleys between the ridges on connector 120, also correspond. In effect, both the pin-bore, and ridge-valley combination provide mechanical stops to the rotation of the flexing wire around the three axes. Indeed, as seen in FIG. 6, ridge 135a has engaged valley 145a to prevent further bending of the flexure wire in a particular direction. Those skilled in the art will appreciate that the scallop shape of the opposing faces of the connectors in fact limits the rotation of the flexing wire about all three axes or the combination thereof.

Figure 4:
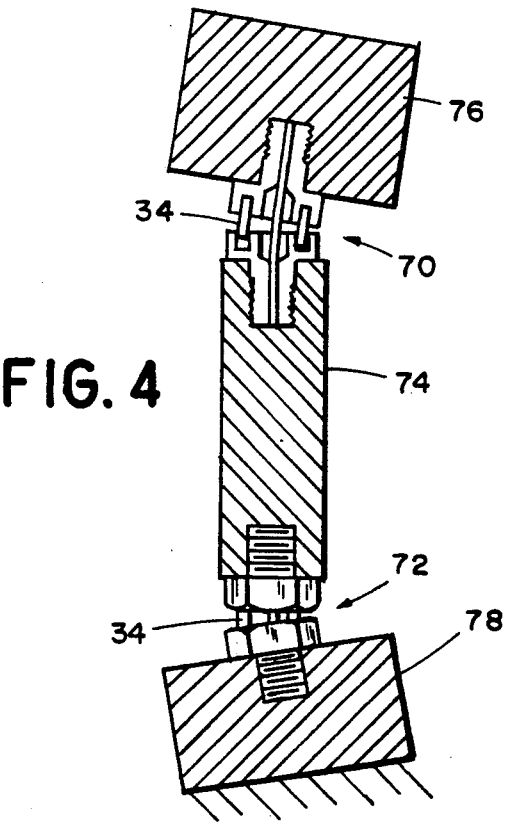
FIG. 4 is a partially schematic and partially cross-sectional view of a pair of the three axis flexures of the invention connected to control objects.

As aforementioned, the flexure of the invention is also preferably configured with both connectors being bolts or screws so as to permit the easy connection of the flexure to rods and master and slave devices. Moreover, in most applications, the flexure of the invention will be used in pairs, with one connector of each pair being connected to a rod. Thus, as indicated by FIG. 4, flexures 70 and 72 are connected by a rod 74 which has threaded ends to accept the flexure connectors. Rod 74 is typically long in comparison to a single flexure assembly, and is rigid so as to transmit axial forces along its long axis. Rod 74 may be said to extend the effective length of the flexure because an object or slave device 76 attached to flexure 70 can be moved over larger distances relative to a control or master device 78 attached to the other flexure without forcing the flexures beyond their limited angular freedom of rotation. Because the pair of flexures 70 and 72, as well as rod 74 connecting the pair, are stiff along the long axis, the distance between the master and slave devices will always remain constant.

Figure 5:
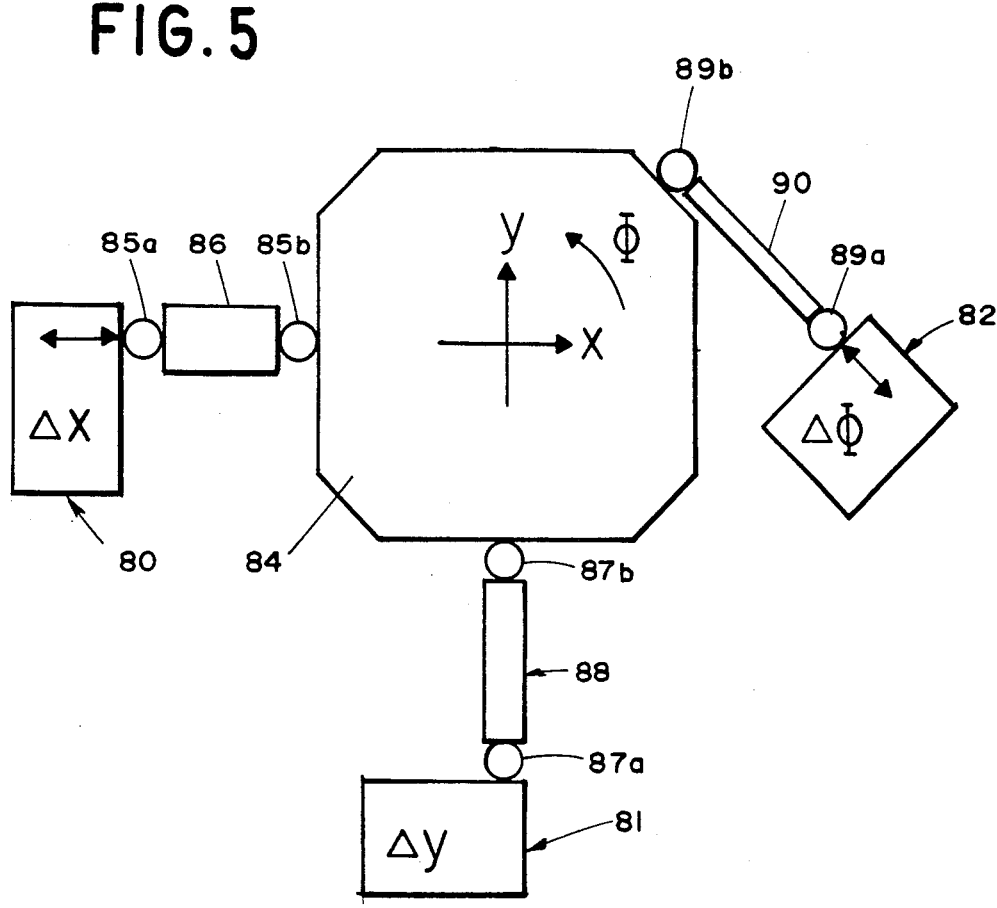
FIG. 5 is a schematic view of a micropositioning device utilizing a plurality of pairs of the three axis flexures of the invention.

A typical application of the flexures of the invention is seen in FIG. 5, where a micropositioning device is schematically presented. Micropositioners 80, 81, and 82 are provided to control the location of table 84 in the x, y, and Φ directions. A pair of flexures connected by a link or rod is provided for each micropositioner. Thus, flexures 85a and 85b, connected by link 86 connect the x-micropositioner 80 to table 84. Likewise, flexures 87a and 87b connected by link 88 connect y-micropositioner 81 to table 84 while flexures 89a and 89b connected by link 90 connect Φ-micropositioner 82 to table 84. If movement in the x direction is required, micropositioner control device 80 can be used to push table 84 along the x axis, as the flexures 85a and 85b, and link 86 will transmit axial forces in that direction. At the same time, flexure sets 87 and 89 will permit movement along the x axis by bending, because flexure sets 87 and 89 are not stiff along the x axis. Similarly, movement of the table 84 along the y axis, and rotation are accomplished by micropositioners 81 and 82, with corresponding bending of the flexure sets which are not rigid in the direction of movement. Because a plane is defined by any three points, control of the exact planar location of the table 84 may be accomplished. Those skilled in the art will appreciate that through the use of six sets of flexures, similar results may be accomplished in three dimensions.

Because the flexing element of the flexure of the invention is a wire which is torsionally resilient, the bending of the wire in monotonic with the load (force or torque applied), and is thus deterministic. In other words, the flexure allows freedom of motion around three axes with no stick slip or lost motion, and the degree of bending may be predicted from the force or torque applied. These characteristics permit accuracy of placement in applications such as seen in FIG. 5, on a microscopic level. The flexure of the invention is also advantageous in that no lubrication, with the accompanying difficulties of out-gassing, depletion, and temperature limitations, is required. Yet another advantage of the flexure invention is that it provides for virtually infinite life with no required maintenance when operated within specifications.

There has been described and illustrated herein, a three axis flexure which provides a joint between two objects, the flexure being very stiff against translational forces along it long axis, but operable with three degrees of freedom over small angles with no lost motion. While particular embodiments of the invention have been described, it is not intended that the invention be limited thereto, as it is intended that the invention be broad in scope and that the specifications be read likewise. Thus, while the connector elements have been described as being identical, one skilled in the art would readily appreciate that each connector could take a separate form, provided that the connectors are spaced apart, but connected by a wire which will permit limited rotation. Likewise, while the connectors have been described with the wire running through the centers thereof, it is clear that the wire bores in the connectors can be skewed, as could the pin bores. Indeed, the bores through the connectors need not even be coaxial. Further, it should be appreciated that the number of pin snubbers and their locations can be changed according to desired results.

Those skilled in the art should also understand that while the bores in the connectors are described as being "tapered", the invention encompasses situations where the "taper" is such that the bore changes from one diameter to another over negligible (little or no) distance. Finally, those skilled in the art will recognize that instead of using pin stops, the connectors can be so formed so as to perform the stopping function themselves. This may be accomplished by locating the connectors in proximate position and shaping the connectors with reciprocal projections such as scallops (ridges and valleys) which will fit together to allow a certain amount of bending motion before causing stopping contact. Of course, this stopping method, or any mechanical equivalent thereof can be combined with pin snubbers if desired. Therefore, it will be apparent to those skilled in the art that other changes and modifications may be made to the invention as described in the specifications without departing from the spirit and scope of the invention as so claimed.

I claim:

1. A flexure comprising:
   (a) a first connector member having a bore located therein;
   (b) a second connector member having a bore located therein, said connector member being axially spaced from said first connector;
   (c) a wire which runs in said bores, connects said first connector member to said second connector member, and is integrally connected to said first and second connector members, said wire being thin relative to said first and second connector members, and sufficiently thin to substantially decouple torque by permitting the bending of said first connector member relative to said second connector around three axes, but providing stiffness against translational forces applied along the long axis of said flexure;
   (d) mechanical stop means for preventing bending of said wire beyond a predetermined angle, wherein one of said first and second connector members is arranged to connect to means for keeping said one of said first and second connector members stationary relative to the other connector member upon the application of torque to said other connector member.

2. A flexure according to claim 1, wherein:
said mechanical stop means comprises at least one stop pin; and
said first and second connector members each have at least one additional bore spaced around said bore for said wire, and said at least one stop pin fits snugly on one of its ends into said at least one additional bore in a connector selected of a group consisting of said first and said second connector and fits loosely on its other end into said at least one additional bore of said other connector.

3. A flexure according to claim 2, wherein:
said at least one stop pin comprises three stop pins.

4. A flexure according to claim 3, wherein:
said stop pins are evenly spaced around and are parallel to said wire.

5. A flexure according to claim 1, wherein:
said bores in said connectors are coaxial and are centrally located in said connectors.

6. A flexure according to claim 5, wherein:
said bores are of approximately the same diameter as said wire but taper outwardly near the connector ends facing the middle of said flexure.

7. A flexure according to claim 6, wherein:
said outward tapers of said bores for said wire in said connectors occurs over negligible distance.

8. A flexure according to claim 1, wherein:
said mechanical stop means comprises the opposing surfaces of said connectors, said opposing surfaces being proximately located and having corresponding ridges and valleys which are configured to stop the relative bending motion of said connectors one to the other at a predetermined angle by the contact of said surfaces.

9. A flexure according to claim 8, wherein:
said bores in said connectors are coaxial and are centrally located in said connectors.

10. A flexure according to claim 9, wherein:
said bores are of approximately the same diameter as said wire but taper outwardly near the connector ends facing the middle of said flexure.

11. A flexure according to claim 10, wherein:
said outward tapers of said bores for said wire in said connectors occurs over negligible distance.

12. A flexure comprising:
    (a) a first connector member having a bore located therein;
    (b) a second connector member having a bore located therein, said bores being coaxial, and said second connector member being axially spaced from said first connector;

(c) a wire which runs in said bores, said bores being centrally located in asid connector members and of approximately the same diameter of said wire but tapering outwardly near the connector ends facing the middle of said flexure, said wire connecting said first connector member to said second connector member and being integrally connected to said first and second connector members said wire being thin relative to said first and second connector members, and sufficiently thin to substantially decouple torque by permitting the bending of said first connector member relative to said second connector around three axes, but providing stiffness against translational forces applied along the long axis of said flexure; and (d) a plurality of stop pins evenly spaced around and parallel to said wire, wherein said first and second connector members have additional bores spaced around said bore for said wire, and said stop pins fit snugly on on of their ends into said additional bores in a connector selected from a group comprising said first connector and said second connector and fit loosely on their other ends into said other connector, wherein, one of said first and second connector members is arranged to connect to means for keeping said one of said first and second connector members stationary relative to the other connector member upon the application of torque to said other connector member.

13. A five axis flexure comprising:
(a) a first three axis flexure;
(b) a second three axis flexure, wherein said first and second three axis flexures each include
  (1) a first connector member having a bore located therein,
  (2) a second connector member having a bore located therein, said second connector member being axially spaced from said first connector,
  (3) a wire which runs in said bores, connects said first connector member to said second connector member, and is integrally connected to said first and second connector members, said three axis flexure permitting bending of said first connector member relative to said second connector member around three axes, but providing stiffness against translational forces applied along the long axis of said three axis flexure; and
  (4) mechanical stop means for preventing bending of said wire beyond a predetermined angle; and
(c) rigid linkage means for connecting a connector member of said first three axis flexure with a connector member of said second three axis flexure.

14. A five axis flexure according to claim 13, wherein:
said mechanical stop means of each three axis flexure comprises at least one stop pin; and
said first and second connector members of each three axis flexure each have at least one additional bore spaced around said bore for said wire, and said at least one stop pin fits snugly on one of its ends into said at least one additional bore in a connector selected of a group consisting of said first and said second connector and fits loosely on its other end into said at least one additional bore of said other connector.

15. A five axis flexure according to claim 14, wherein:
said at least one stop pin of each three axis flexure comprises three stop pins which are evenly spaced around and are parallel to said wire.

16. A five axis flexure according to claim 13, wherein:
for each three axis flexure, said bores in said connectors are coaxial and are centrally located in said connectors, the bores being approximately of the same diameter as said wire but tapering outwardly over negligible distance near the connector ends facing the middle of the three axis flexure.

17. A five axis flexure according to claim 13, wherein:
for each three axis flexure, said mechanical stop means comprises the opposing surfaces of said connectors, said opposing surfaces being proximately located and having corresponding ridges and valleys which are configured to stop the relative bending motion of said connectors one to the other at a predetermined angle by the contact of said surfaces.

18. A five axis flexure according to claim 17, wherein:
for each three axis flexure, said bores in said connectors are coaxial and are centrally located in said connectors, the bores being approximately of the same diameter as said wire but tapering outwardly over negligible distance near the connector ends facing the middle of the three axis flexure.

19. A five axis flexure according to claim 13, wherein:
said wires of said three axis flexures are thin relative to said first and second connector members of said three axis flexures, and sufficiently thin to substantially decouple torque by permitting, in each three axis flexure, the bending of said first connector member relative to said second connector around three axes, but providing stiffness against translational forces applied along the long axis of each flexure, and
for one of said three axis flexures, one of said first and second connector members is arranged to connect to means for keeping said one of said first and second connector members stationary relative to the other connector member upon the application of torque to said other connector member.

20. A five axis flexure according to claim 19, wherein:
said rigid linkage means comprises a rod having threaded ends for accepting at least one connector member of each of said three axis flexures.

* * * * *